3,466,247
METHOD OF PREPARING CATIONIC BITUMEN EMULSIONS
Shunzo Ohtsuka and Tadashi Doi, Wakayama-shi, Japan, assignors to Kao Soap Co., Ltd., Tokyo, Japan, a corporation of Japan
No Drawing. Filed Mar. 20, 1967, Ser. No. 624,137
Int. Cl. C10b 3/02; B32b 11/04; B01j 13/00
U.S. Cl. 252—311.5          4 Claims

ABSTRACT OF THE DISCLOSURE

A method of preparing an oil-in-water type cationic bitumen emulsion in which the bitumen is emulsified in water with a quaternary ammonium salt derivative of an ethylene oxide condensate of a long chain alkyl triamine of the formula:

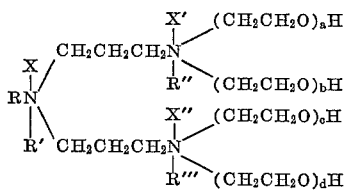

wherein R is a saturated or unsaturated alkyl radical of 8 to 22 carbon atoms, each of R', R" and R''' is a methyl or ethyl radical, each of X, X' and X" is a halogen, $CH_3SO_4$ or $C_2H_5SO_4$, each of $a$, $b$, $c$ and $d$ is the integer 1 or an integer larger than 1 and $a+b+c+d$ is from 4 to 40.

FIELD OF THE INVENTION

This invention relates to a method of preparing oil-in-water cationic bitumen emulsions by emulsifying a bitumen in water with a quaternary ammonium salt derivative of an ethylene oxide condensate of a long chain alkyl triamine.

When a bitumen emulsion obtained by emulsifying in water a bitumen, such as an asphalt or tar, is to be used as a bonding or coating agent for such uses as road pavements, waterproof embankments, roofings, paints and floor coverings, it is necessary to obtain a sufficient bond between the surface of the substrate, such as aggregate, sand, soil, a cement concrete or metal, and the bitumen. However, the surface of such substrate on which the bitumen emulsion is to be applied is generally so hydrophilic that, when sufficient water is present, the adhesion of the bitumen thereto will be difficult. Therefore, it is necessary to remove water by evaporation or any other action prior to the deposition of the bitumen. This means in the actual work that a period for drying to such degree that the bitumen can be deposited is required after the substrate is prepared and that therefore the construction period will be long. If such conditions as high humidity and low temperature are added, the construction period will be further lengthened. Further, if there is a rainfall during the application period, the applied bitumen will not be able to be deposited on the surface of the substrate, but will be likely to be washed away. Further, in case the surface area of the fine aggregate or soil is large and the mixing grade emulsion is mixed with a porous substance, the water in the emulsion will be so quickly removed by absorption of the water into the pores by capillary action and wetting of the surface of the substance that the affinity between the wet substance as mentioned above and the bitumen will be short and therefore the bitumen particles in the emulsion will only combine with each other, but will not be able to perform the action of a bonding agent between the substances. Even after the water is removed and the bitumen is once deposited on the aggregate, if the bitumen is subjected to the action of water, such as rainwater or groundwater, due to the above-mentioned property inherent in the aggregate, the bitumen will be stripped from the surface of the aggregate.

DESCRIPTION OF THE PRIOR ART

It is already known to use a cationic emulsifier in order to improve such properties as are mentioned above and to obtain a bitumen emulsion in which bitumen particles dispersed in water phase will be quickly and securely deposited on the aggregate. That is to say, generally, in a cationic bitumen emulsion obtained by using a cationic emulsifier, the bitumen particles will be positively charged by obtaining the positive charge of the emulsifier molecules. On the other hand, the aggregate surface in contact with water often will generally be negatively charged. Therefore, the electric attraction of both positive and negative charges will act so that the bitumen may be easily deposited on the surface of the aggregate. Further, in such case, the emulsifier molecules will be oriented and adsorbed on the interface of the bitumen and aggregate so as to act to bond them together and therefore, with the action of water, the emulsifier will act to prevent the stripping of bitumen from the surface of the aggregate.

For the above reasons, it is recognized that the mixing grade bitumen emulsion employing a cationic emulsifier is effective to improve the coating bondability of the bitumen and the strength of the structure and to prevent strength reduction or destruction of the structure after the application.

However, there is known no cationic emulsifier practically adapted for the preparation of mixing grade emulsions because, in the case of road paving, in the penetrating work process, the bitumen particles are required to be quickly deposited on the surface of the aggregate but, in the mixing process, the bitumen particles are required to have a property of showing a favorable miscibility with the aggregate or particularly with the fine aggregate or soil by properly controlling the setting speed. Further, it is desired not only to reduce the speed but also to provide a strong adhesion of the bitumen to the surface of the aggregate as an inherent feature of the cationic emulsion. It has been difficult to simultaneously satisfy these requirements.

SUMMARY OF THE INVENTION

As a result of investigating to find cationic emulsifiers capable of satisfying the three requirements of, first, effective emulsifiability, second, adhesion to the aggregate and, third, miscibility with the aggregate, we have discovered that a quaternary ammonium salt derivative of an ethylene oxide condensate of a long chain alkyl dipropylene triamine as defined below effectively satisfies these requirements.

Thus, the present invention relates to a method of preparing cationic bitumen emulsions characterized by emulsifying a bitumen with a quaternary ammonium salt derivative of an ethylene oxide condensate of a long chain alkyl triamine represented by the formula:

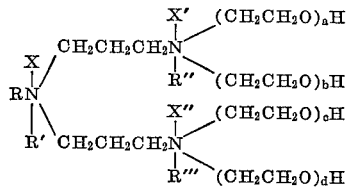

wherein R is a saturated or unsaturated alkyl radical of 8 to 22 carbon atoms, each of R', R" and R''' is a methyl or ethyl radical, each of X, X' and X" is a halogen, $CH_3SO_4$ or $C_2H_5SO_4$, each of $a$, $b$, $c$ and $d$ is respectively the integer 1 or an integer larger than 1 and $a+b+c+d$ is from 4 to 40.

The quaternary ammonium salt represented by the above-mentioned formula can be easily industrially produced. For example, ammonia is reacted with a long chain fatty acid obtained by the hydrolysis of an oil or fat so as to make a corresponding nitrile and a long chain alkyl amine is obtained by the catalytic hydrogenation of the nitrile. When acrylonitrile is made to react with the long chain alkyl amine, there will be obtained a dicyanoethylated alkyl amine in which two moles of acrylonitrile are added per mole of amine. When this is again catalytically hydrogenated so as to become a long chain alkyl dipropylene triamine and a required amount of ethylene oxide is condensed on it, ethylene oxide condensate represented by the above-mentioned formula will be obtained. If an alkylating reagent, such as, for example, methyl chloride, is made to act on this ethylene oxide condensate, a quaternary ammonium salt, such as is represented by the above-mentioned formula, will be obtained.

The quaternary ammonium salt represented by the above-mentioned formula shows an effective bitumen emulsifying property due to its inherent chemical structure and gives the bitumen a high adhesion to the aggregate due to its cationic nitrogen. Further, as the ethylene oxide chain and the cationic nitrogen are hydrophilic, the surface of the bitumen particles on which the emulsifier of the present invention is adsorbed will have a property of strongly bonding water. Further, by properly adjusting the number of condensed moles of ethylene oxide, the above-mentioned property of bonding water can be adjusted, the speed of the adhesion of the bitumen particles to the aggregate and the speed of bonding them together can be adjusted and thus a proper miscibility with the aggregate can be given to the emulsion.

In general, the oil-in-water type bitumen emulsion consists of from about 50 to 70% by weight bitumen and from about 30 to 50% by weight in water. In the present invention, by using from 0.3 to 3% by weight of the emulsifier to such emulsion, the expected effect can be obtained.

DETAILED DESCRIPTION

The present invention shall now be explained with reference to examples.

Example 1

Ethylene oxide condensates of a hardened tallow alkyl dipropylene triamine, the condensates having ethylene oxide mol numbers of 15, 20, 30 and 40, were made to react with methyl chloride so as to be of a quaternary ammonium salt type (which shall be briefly called TQ-15, TQ-20, TQ-30 and TQ-40, respectively). A fixed amount of each of said condensates was dissolved in 1290 g. of water. The pH of the solution was adjusted with acetic acid. The solution was warmed at 70° C. so as to be an emulsifying solution. One thousand seven hundred ten g. of a naphthene base straight asphalt (San Joaquin crude oil of a pentration of 150 to 200) were heated and melted at 120° C.

The asphalt was gradually poured while stirring into the emulsifying solution. Then, the solution was immediately passed through a colloid mill-type homogenizer and the emulsification was finished to obtain an emulsion.

The characteristics of the thus obtained asphalt emulsions were as shown in Table 1 and favorable emulsions were obtained.

TABLE 1

| Emulsifiers | Emulsifier concentration, percent [1] | pH of the emulsifying solution | State of the emulsion | Emulsion stability [2] | Aggregate mixing test [3] | Adhesion test [5] |
|---|---|---|---|---|---|---|
| TQ-15 | 2.0 | 7.1 | Brown | 0 | 0 | 0 |
| TQ-20 | 2.0 | 7.2 | do | 0 | 0 | 0 |
| TQ-30 | 2.0 | 7.0 | do | 0 | 0 | 0 |
| TQ-40 | 2.0 | 7.0 | do | 0 | 0 | 0 |
| Anion [4] | 0.5 | 11.0 | do | 0 | X | X |

[1] Represented in percent by weight of the emulsifier in the emulsion.
[2] Emulsion stability. 0: High; X: Low.
[3] Aggregate mixing test. Made according to the method mentioned in the Petroleum Asphalt Emulsion Standard of JIS K-2208 (1961). 0: represents a pass; X: represents a failure.
[4] Sodium alkyl benzene sulfonate was used. The pH of the emulsifying solution was adjusted with caustic soda.
[5] The adhesion test was made by the following method. Aggregate No. 5 for roads (JIS A-5001) (using quartzites) was immersed in water for one minute, was then immediately immersed in the emulsion for one minute, was taken out, was left standing at room temperature for 24 hours and was then immersed in warm water at 60° C. for two hours and then the rate (area in percent) of the remaining asphalt film was observed to determine the adhesion. 0: Amount of the remaining emulsion film of more than 90%; X: Amount of the remaining emulsion film of less than 50%.

Example 2

When the same emulsification as in Example 1 was carried out by using 3% of each of the emulsifiers TQ-20, TQ-30 and TQ-40 for each emulsion, favorable emulsions were obtained. The results were as in Table 2.

TABLE 2

| Emulsifiers | pH of the emulsifying solution | State of the emulsion | Emulsion stability [1] | Adhesion test [2] | Kaolin mixing test [3] |
|---|---|---|---|---|---|
| TQ-20 | 7.1 | Brown | 0 | 0 | 0 |
| TQ-30 | 7.0 | do | 0 | 0 | 0 |
| TQ-40 | 7.1 | do | 0 | 0 | 0 |

In the table, notes (1) and (2) are the same as in the above.
[3] Kaolin mixing test. It was made according to the test method applied to MK-3 (Emulsions for Mixing with Soils) mentioned in the cationic Petroleum Asphalt Emulsion Standards (provided by Japan Asphalt Emulsion Association in March, 1962). 0: The workability of the mixture was high and the residue on the sieve was less than 2%; X: Not miscible.

With the known cationic emulsifiers, the emulsion stability and the adhesion of the bitumen to the aggregate could be satisfied but it has been difficult to obtain mixing grade emulsions to satisfy miscibility with a soil such as is represented, for example, by the Kaolin mixing test. But, as evident also from the above-mentioned example, according to the present invention, there can be prepared mixing grade cationic emulsions with which not only the emulsion stability and the adhesion of the bitumen to the aggregate but also the property of the miscibility with such fine aggregate as a soil could be satisfied.

While a particular preferred embodiment of the invention has been described, it will be apparent that the invention contemplates such changes or modifications therein as lie within the scope of the appended claims.

The embodiments of the invention in which an exclusive property or privilege is claimed are defined as follows.

We claim:
1. A method of preparing oil-in-water type cationic bitumen emulsions comprising emulsifying a bitumen in water with a quaternary ammonium salt derivative of an ethylene oxide condensate of a long chain alkyl triamine represented by the formula:

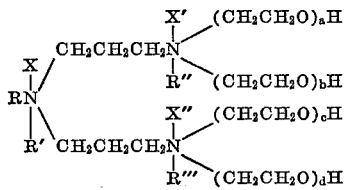

wherein R is a saturated or unsaturated alkyl radical of 8 to 22 carbon atoms, each of R', R" and R''' is a member selected from the group consisting of methyl and ethyl radicals, X, X' and X" are members selected respectively from the group consisting of halogen, $CH_3SO_4$ and $C_2H_5SO_4$, $a$, $b$, $c$ and $d$ are respectively the integer 1 or an integer larger than 1 and $a+b+c+d$ is from 4 to 40.

2. A method of preparing oil-in-water type cationic bitumen emulsions comprising emulsifying in water a bitumen with a quaternary ammonium salt derivative of an ethylene oxide condensate of a long chain alkyl triamine represented by the formula:

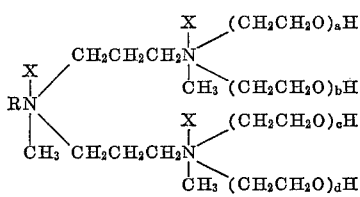

wherein R is a hardened tallow alkyl radical, X is a halogen, $a$, $b$, $c$ and $d$ are respectively the integer 1 or an integer larger than 1 and $a+b+c+d$ is 20 to 40.

3. A method as claimed in claim 1, wherein the emulsion consists of from about 50 to 70% by weight bitumen and from about 30 to 50% by weight water and said quaternary ammonium salt derivative is present in an amount of from 0.3 to 3% by weight of said emulsion.

4. A method as claimed in claim 2, wherein the emulsion consists of from about 50 to 70% by weight bitumen and from about 30 to 50% by weight water and said quaternary ammonium salt derivative is present in an amount of from 0.3 to 3% by weight of said emulsion.

References Cited

UNITED STATES PATENTS 2,901,372  8/1959  Dybalski et al. _____ 106—273
3,032,507  5/1962  Wright _____ 252—311.5

LEON D. RODSOL, Primary Examiner

P. E. WILLIS, Assistant Examiner

U.S. Cl. XR

106—277; 252—355, 357; 260—567.6, 501.15